(12) United States Patent
Roper

(10) Patent No.: US 12,531,059 B2
(45) Date of Patent: Jan. 20, 2026

(54) USING METADATA FOR IMPROVED TRANSCRIPTION SEARCH

(71) Applicant: Zoom Video Communications, Inc., San Jose, CA (US)

(72) Inventor: Brandon Kevin Roper, Washington, UT (US)

(73) Assignee: Zoom Communications, Inc., San Jose, CA (US)

( * ) Notice: Subject to any disclaimer, the term of this patent is extended or adjusted under 35 U.S.C. 154(b) by 301 days.

(21) Appl. No.: 18/087,158

(22) Filed: Dec. 22, 2022

(65) Prior Publication Data
US 2024/0212676 A1 Jun. 27, 2024

(51) Int. Cl.
| | |
|---|---|
| *G10L 15/22* | (2006.01) |
| *G06F 16/638* | (2019.01) |
| *G06F 16/683* | (2019.01) |
| *G06F 40/166* | (2020.01) |
| *G06F 40/58* | (2020.01) |
| *G10L 15/04* | (2013.01) |
| *G10L 15/06* | (2013.01) |
| *G10L 15/197* | (2013.01) |
| *G10L 15/30* | (2013.01) |
| *G10L 15/18* | (2013.01) |

(52) U.S. Cl.
CPC .......... *G10L 15/197* (2013.01); *G06F 16/638* (2019.01); *G06F 16/685* (2019.01); *G06F 40/166* (2020.01); *G06F 40/58* (2020.01); *G10L 15/04* (2013.01); *G10L 15/063* (2013.01); *G10L 15/22* (2013.01); *G10L 15/30* (2013.01); *G10L 2015/0635* (2013.01); *G10L 15/1822* (2013.01)

(58) Field of Classification Search
CPC ....................................................... G10L 15/22
See application file for complete search history.

(56) References Cited

U.S. PATENT DOCUMENTS

| | | | |
|---|---|---|---|
| 8,868,409 B1 * | 10/2014 | Mengibar | G06F 40/30 |
| | | | 704/250 |
| 2017/0229124 A1 * | 8/2017 | Strohman | G10L 15/32 |
| 2018/0012592 A1 * | 1/2018 | Gruenstein | G10L 15/08 |
| 2019/0259377 A1 * | 8/2019 | Mertens | G06F 16/638 |
| 2021/0074277 A1 * | 3/2021 | Lewis | G10L 15/22 |
| 2022/0059095 A1 * | 2/2022 | Faria | G10L 15/183 |
| 2022/0115020 A1 * | 4/2022 | Bradley | G06F 40/134 |
| 2022/0353469 A1 * | 11/2022 | Huang | G06F 40/279 |
| 2022/0392439 A1 * | 12/2022 | Siohan | G10L 15/063 |

* cited by examiner

*Primary Examiner* — Jialong He
(74) *Attorney, Agent, or Firm* — Kilpatrick Townsend & Stockton LLP

(57) ABSTRACT

The present disclosure relates to systems and methods for using metadata to improve identifying desired information within a transcription. The systems and methods including receiving audio data, recognizing terms within the audio data, identifying alternate recognized terms within the audio data, the alternate recognized terms corresponding to the recognized terms within the audio data, generating a transcription based on the recognized terms, and generating metadata associated with the transcription, the metadata comprising the alternate recognized terms and with links between the alternate recognized terms and the recognized terms within the transcription. The systems and methods also include receiving a search query for a string within the transcription, searching for the string within the transcription and within the metadata, and providing one or more search results based on the searching.

17 Claims, 10 Drawing Sheets

USING METADATA FOR IMPROVED TRANSCRIPTION SEARCH

FIELD

The present disclosure relates generally to improving searching within a transcription, and more particularly, to using metadata to improve identifying desired information within a transcription.

DETAILED DESCRIPTION

Figure 1:
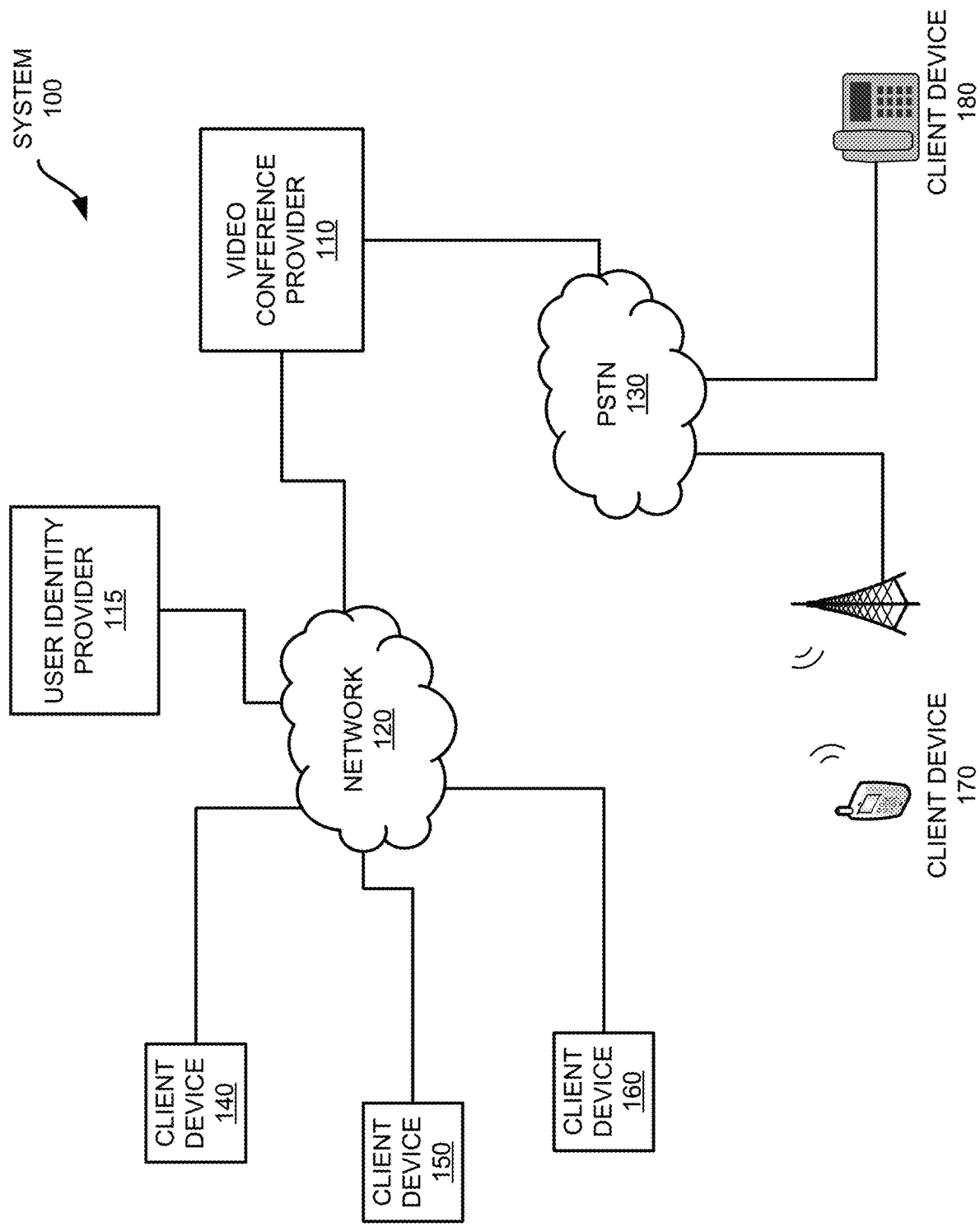
FIG. 1 is an illustration depicting an example video conferencing system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

With the evolution of media and communications, there have been many advancements, including in providing computer generated speech to text transcription and predictive closed captioning. However, computer generated speech to text is often inconsistent and prone to errors. One example of frequently occurring errors includes the inaccuracy of the transcription of words that sound similar. Inconsistent transcription can be problematic for hearing-impaired users and other users relying on the transcript for different operations. For example, for users trying to search through a lengthy transcript for specific words and phrases, one wrong transcription can cause them to miss crucial information. The longer the transcript the harder it is to find key words, especially if there are errors in the transcription. The present disclosure relates generally to improving searching within a transcription, and more particularly, to using metadata to improve identifying desired information within a computer-generated transcription.

The present disclosure can be adapted to work with or constructed using any combination of speech to text transcription systems and methods. As part of the automated speech to text transcription, the present disclosure collects metadata for all potential terms or phrases for the speech to text transcription. Specifically, when a text to speech conversion occurs, there are confidence levels associated with each word being converted. The word with the highest confidence value will be used in the transcription, where the alternative words with lower confidence values will be stored as metadata, associated with the selected high confidence word. This is in contrast to traditional system, which may discard any alternative words. Even though the word selected has the highest confidence, according to some model, the selected word may not be the correct word. Whereas one of the alternative words with a lower confidence value may have been the correct transcription of the speech. For example, the word "their" could be transcribed with confidence levels of: there—80%, their—75%, they're—48%, they are—2%. In conventional transcripts, the word "there" would be used such that a user searching for the word "their" would not return a result for that part of the conversation. However, when the present disclosure links metadata to the selected word of "there" to include the word "their", then a search of the metadata could return this part of the conversation. For example, if this metadata is included with the transcript, then when the searcher looks for "there" it could highlight all the other possible transcriptions from the metadata that were not selected (e.g., their, they're, they are).

There are other advantages to providing a user with access to the alternative words in addition to the selected words within the transcript. One advantage is the ability to improve the artificial intelligence (AI), machine learning (ML), natural language processing, (NLP), etc. used in the computer-generated transcription. For example, when a user corrects a word within a transcript, that correction can be used to update that transcription and/or retrain the AI, ML, NLP, etc. This provides a learning function for improving both that transcription and the transcription model as a whole.

System Overview

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2A:
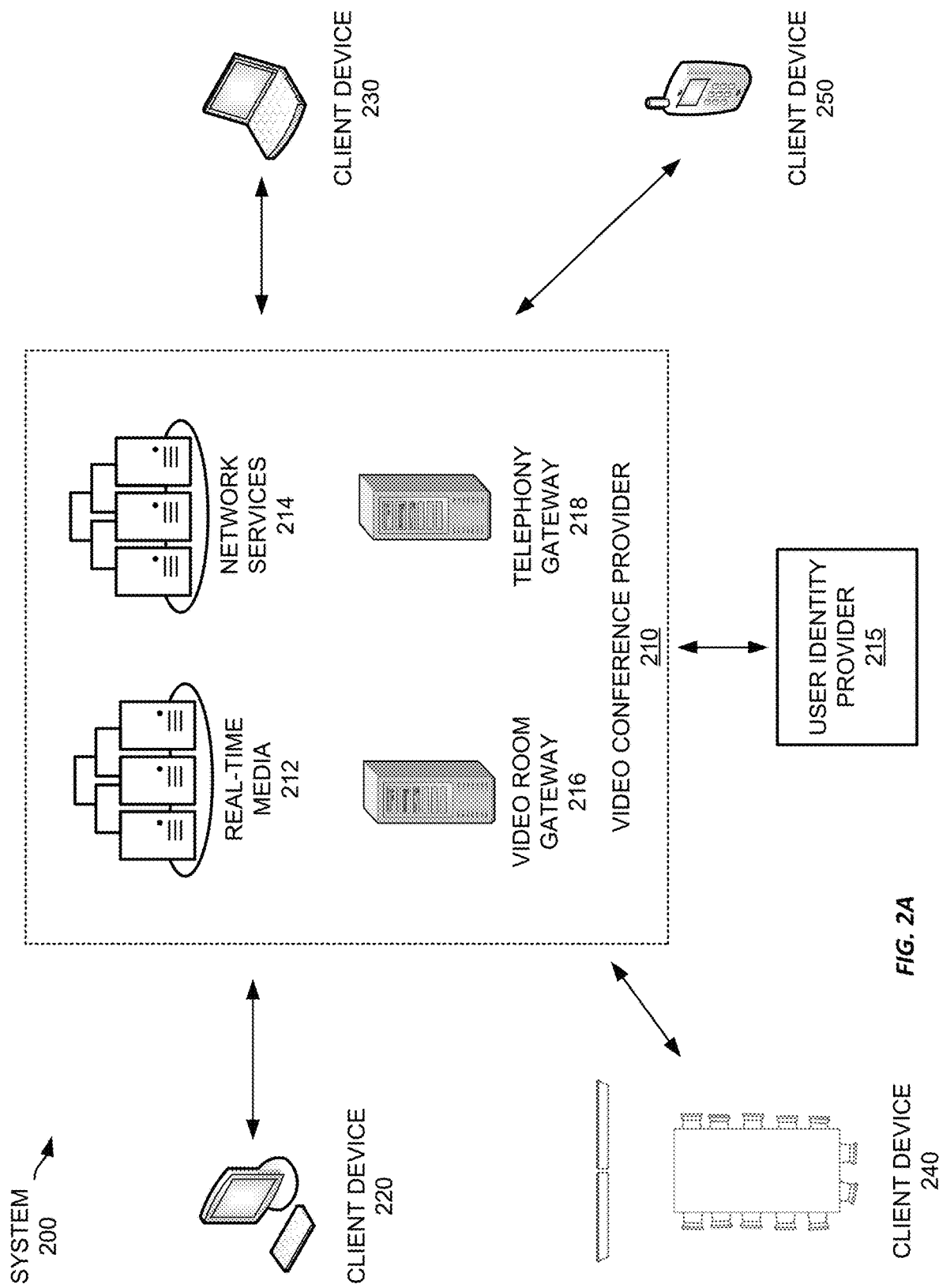
FIGS. 2A and 2B are illustrations depicting an example video conferencing system in accordance with various embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 2B:
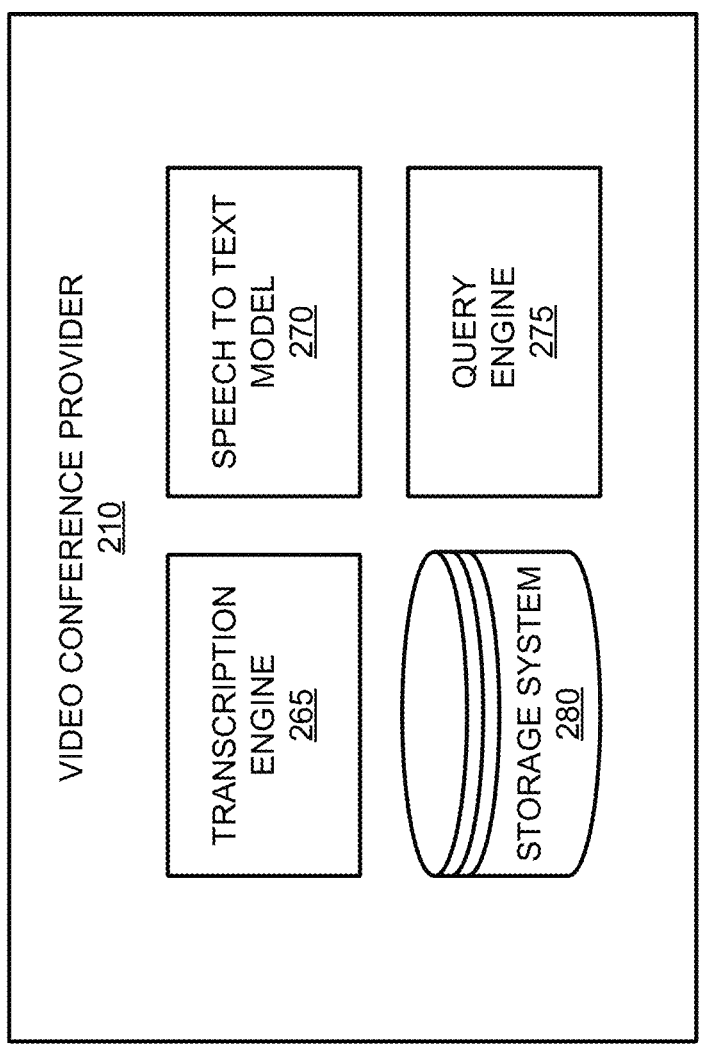

Referring now to FIG. 2B, FIG. 2B shows an example of components included within a video conference provider 210. In some embodiments, the video conference provider 210 includes a combination of a transcription engine 265 and a query engine 275. Although discussed with respect to the video conference provider 210, each of the transcription engine 265 and the query engine 275 can be included within any of the client devices 220, 230, 240, 250. Additionally, each of the transcription engine 265 and the query engine 275 can be implemented individually or in combination.

In some embodiments, the transcription engine 265 can be configured to perform computer generated speech to text transcriptions. The speech to text can be performed using any combination of methods, including AI, ML, NLP, or a combination thereof to generate transcriptions of a conversation. The transcription engine 265 can receive an audio input of a conversation, parse the audio input into one or more segments, and predict a term including a word, phrase, sentence, etc. for each of the segments. In some embodiments, the transcription engine 265 can include or otherwise access a speech to text model 270 to analyze speech audio and determine which text should be associated with the speech audio. The transcription engine 265 can also update and train the speech to text model 270 based on feedback from a user, information in the storage system 280, other outside sources, or a combination thereof.

In some embodiments, the transcription engine 265 can perform a prediction analysis on each segment to determine a probability that the speech for that segment is a particular term. In other words, the transcription engine 265 can analyze the speech to determine what words are recognizable and predict which of those words are most likely the correct word associated with the speech. For each possible term, the transcription engine 265 can assign a probability or confidence value that it is the correct term representing that segment of speech. In some embodiments, transcription engine 265 can rank the terms or recognized words by their confidence score. The term or recognized word with the highest confidence score can be added to the transcription while the remaining terms or recognized words can be linked to the term or recognized words with the highest confidence score and stored as metadata. Once the transcription engine 265 generates a transcription, it can be stored to be accessed by a user for viewing (e.g., via a client device).

In some embodiments, the transcription engine 265 can be configured to translate speech from a first language to text of a second language and/or translate a transcription from a first language into a transcription in a second language. The translation can be performed using any combination of speech to text or text to text translations between any combination of languages. For example, translation between languages can be performed using any combination of rule-based machine translation, statistical machine translation, hybrid machine translation, neural machine translation, etc. In addition to translating the transcription, the transcription engine 265 can translate the metadata. The translation of metadata can be performed on existing metadata (or metadata transcript) or it can be new metadata generated from the captured speech. In other words, the transcription engine 265 can translate previously created metadata or it can create the metadata using the translated text. When translating existing metadata, the metadata text can be translated from a first language to text in a second language. When creating new metadata from speech, the transcription engine 265 can translate the transcription (or captured speech) from a first language to a second language and then perform a prediction analysis on each translated segment to determine a probability that the translated text for that segment is a particular term in the translated language. For example, as discussed with respect to the speech to text transcription, alternate translated terms can be identified for each of the terms within the translated transcription and the alternate translated terms can be linked to the translated term and stored as translated metadata. The probability can be a probability that the predicted text is the spoken word or it can be the probability that the translation is the correct translation (text to text or speech to text translations). The transcription engine 265 can save the transcription and/or the metadata in a first language and the second language after a translation has been performed.

The transcription and corresponding metadata can be formatted and stored in any combination of methods that enables the remaining terms or recognized words within metadata to be associated with the respective correct terms within the transcription. In one example, the transcription engine 265 can generate two versions of the transcript, one that has just the recognized words and the second that has the recognized words as well as embedded metadata for the alternate terms. For example, the transcription could include, "There were seven people at the conference.", and the metadata transcript would include, "There <alt>their, they're, they are</alt>were <alt>we're, where, wear</alt>seven <alt>Sven, Melvon, even</alt>. . . ". The transcription and/or the metadata transcription could include additional data. For example, the transcription and/or the metadata transcription could also include pointers to the corresponding text within the other transcription, confidence scores, etc.

In some embodiments, the video conference provider 210 can include or otherwise be communicatively coupled to a storage device 280. The storage device 280 can include any combination of computing devices configured to store and organize a collection of data. For example, storage device 280 can be a local storage device on the video conference provider 210, a remote database facility, or a cloud computing storage environment. The storage device 280 can also include a database management system utilizing a given database model configured to interact with a user for accessing the database metadata. In some embodiments, the transcription, the metadata and the confidence scores associated with the metadata can be stored in the storage device 280. The transcription can be stored in a manner in which metadata is associated with or otherwise linked to the words within the transcription. For example, each recognized or predicted word in the transcription can be associated with an identifier (or position within the transcription) then each of the alternate recognized or predicted words for that recognized or predicted word can be associated with that identifier (or position within the transcription). Additionally, the transcription and the metadata can be stored in a manner in which both can be searched.

In some embodiments, the query engine 275 can be configured to search any combination of a transcription and metadata to identify one or more search strings within the transcription and/or metadata. The query engine 275 can also be configured to identify which word or words within a transcription are associated with metadata, such that when metadata is identified within a search query, its location within the transcription can be identified and presented to a user. Continuing the above example, when a string for one of alternate recognized or predicted words within the metadata matches a search string, the query engine 275 can check an identifier (or position within the transcription) associated with that metadata and identify the recognized or predicted word within the transcription associated with that identifier (or position within the transcription). In some embodiments, the query engine 275 can be configured to highlight or otherwise emphasize the terms within the transcription matching the string within the search query. The highlighting or emphasis can include highlighting a string within the transcription matching the search string and/or emphasizing a string associated with metadata matching the search string (see, FIG. 3A). The query engine 275 can provide a distinction between whether the search string directly matches with a string within the transcription or whether the search string matches a string within the metadata (see, FIG. 3B). In some embodiments, the query engine 275 can return the relevant portion of the transcript and the corresponding terms from the metadata in a format which can be used by the client for presentation to a user. For example, when a string matches a string within the metadata, the query engine 275 can provide information necessary for the GUI 300 to generate a drop down with a list of alternative terms 350 (see, FIG. 3C).

In some embodiments, the query engine 275 can be configured to search for any combination of a transcription and metadata to identify one or more search strings within the transcription and/or metadata that closely match the search terms. In other words, if a misspelled word is entered into a search, assuming all the words within the transcription and metadata are correctly spelled words, conventionally no matches would be identified, since the query engine 275 will search for words as entered by the searcher (correctly or incorrectly spelled). By searching strings that are closely matching the search query, it may be helpful for searchers to find their intended search terms, even when misspelled. For example, if a user searches for misspelled "asymmetric," the query engine 275 will not identify "asymmetric" as a match, even if a transcription is correct. By searching for strings that are similar in spelling, (e.g., the words with the highest confidence level) and the metadata (i.e., words with lower non-zero confidence levels that were not selected for the transcription), the query engine 275 can provide more options to the searcher. Therefore, the query engine 275 can compare the searched "assymmetric" with "Ace Emmett Rick" in the transcript and with "asymmetric," "a sim metric," and "asymmetry" in the metadata and return them as results since "assymmetric" and "asymmetric" have similar spellings. The query engine 275 could potentially find other similar words with confidence levels and highlight them as being relevant but not exact.

In some embodiments, the query engine 275 can be configured to search for any combination of a translated transcription and translated metadata to identify one or more search strings within the translated transcription and/or translated metadata that closely match the search terms. In other words, if a user performs a translation of the transcription from a first language to a second language, the query engine 275 can search terms within the original transcription and metadata and/or within the translated transcription and translated metadata. This allows a user the ability to search a transcription in their preferred language. There may also be an option to elect to search the transcription in a second language, in which a translation will be performed and the search conducted thereafter.

Referring now to FIGS. 3A-3D, FIGS. 3A-3D show example graphical user interfaces (GUIs) 300 that a user's (or participant's) client device may display while interacting with another participant during a virtual meeting and/or while reviewing a transcription (e.g., within a recorded virtual meeting). A client device, e.g., client devices 140-180, 220-250, executes video conferencing software, which in turn displays the GUI 300 on the client device's display. Here, the main viewing area 302 (or first viewing area) may display various images, depending on the configuration of the GUI 300 chosen by the videoconference participant. In this example, the main viewing area 302 is displaying an image of the current or active speaker 304 in a videoconference. The GUI 300 also includes a gallery strip 306. The gallery strip 306 displays thumbnail images of the most recent speakers in the videoconference. The GUI 300 also includes a toolbar 308 that includes various user controls 310-322, as examples, controls for video devices, microphones, chat functions, gesture functions, and recording functions. Controls 310, 312 may allow the participant to toggle on or off audio or video streams, respectively, captured by a microphone or camera connected to the client device. Control 314 allows the participant to view any other participants in the video conference with the participant, while control 316 allows the participant to send text messages to the other participants. Control 318 allows the participant to share content from their client device. Control 320 allows the participant to toggle recording of the meeting, and control 322 allows the user to select an option to join a breakout room, though in this example, with only two participants, breakout room functionality may be disabled.

In some embodiments, the GUI 300 includes an audio transcription window 340 including a transcription generated for a particular live meeting recording thereof. The audio transcription window 340 can include the text version of the transcription (e.g., generated by the transcription engine 265) which can be scrolled through and read by a user. For example, the transcription provided in FIG. 3A reads, "Now there is a new feature where you can search a speech to text transcription for a meeting. The search query can search the words provided in the vans ripped as well as alternative words that match the target query." In some embodiments, the GUI 300 includes a search bar 342 for entering a string of text for a search query. The search bar 342 can receive the text string through any combination of inputs. The search bar 342 can receive the text string and provide the string for comparison to the transcription as well as the metadata for that transcription (e.g., by the query engine 275). For example, the search bar 342 provided in FIG. 3A reads, "Transcript", which would cause the string "Transcript" to be compared against the transcription and corresponding metadata.

Figure 3A:
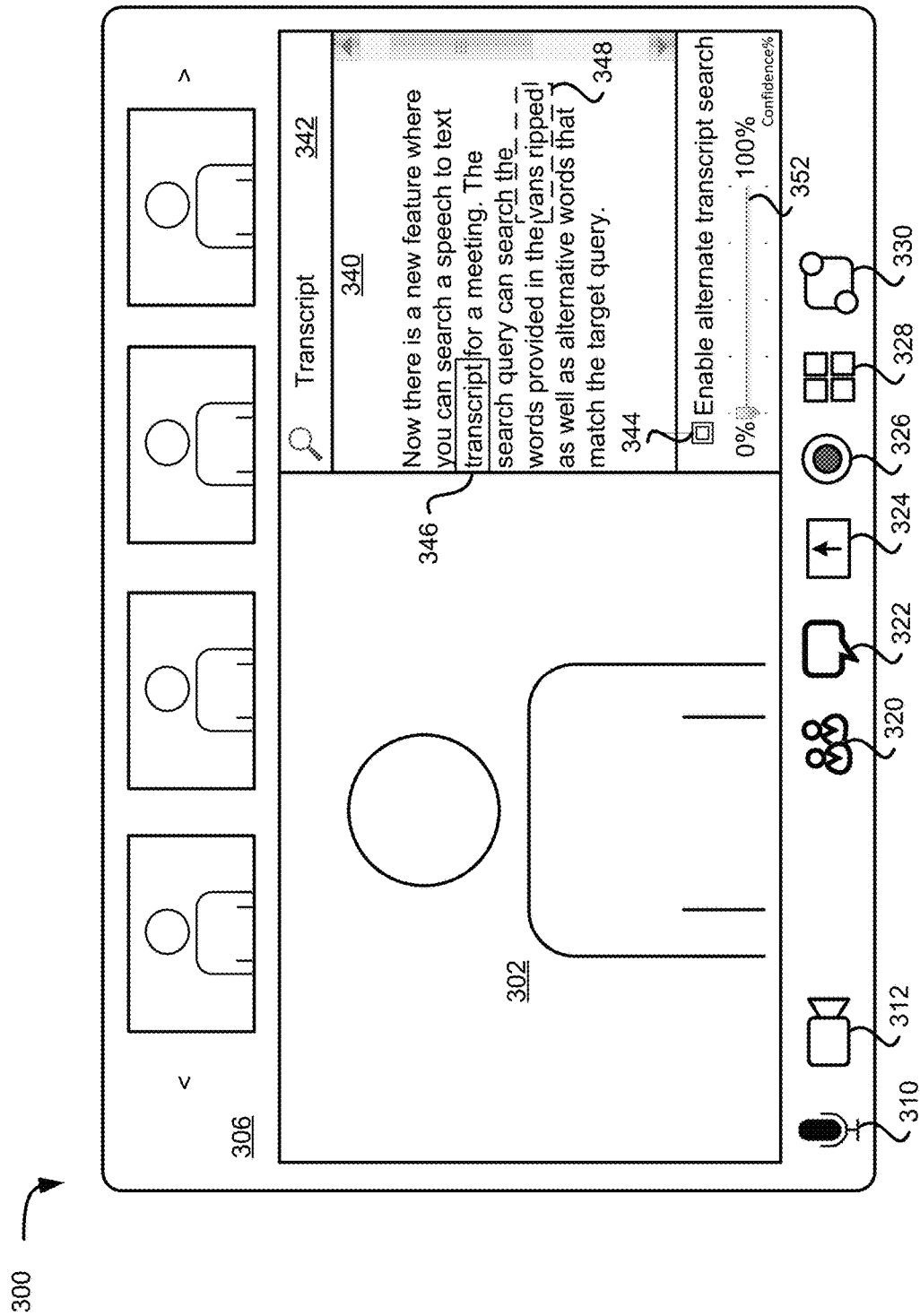
FIGS. 3A, 3B, 3C, and 3D are illustrations of example graphical user interfaces ("GUIs") in accordance with various embodiments.
Figure 3B:
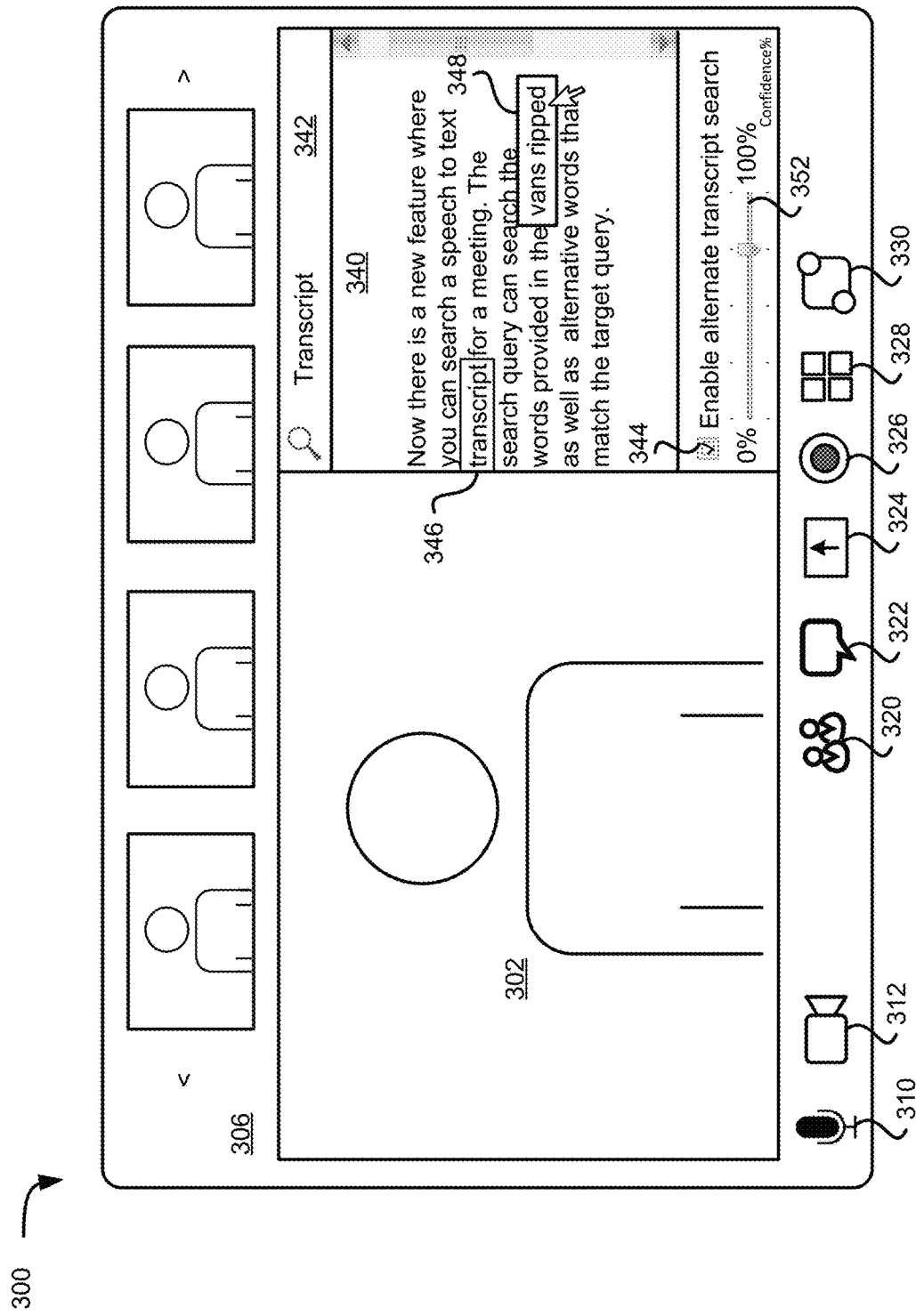
Figure 3C:
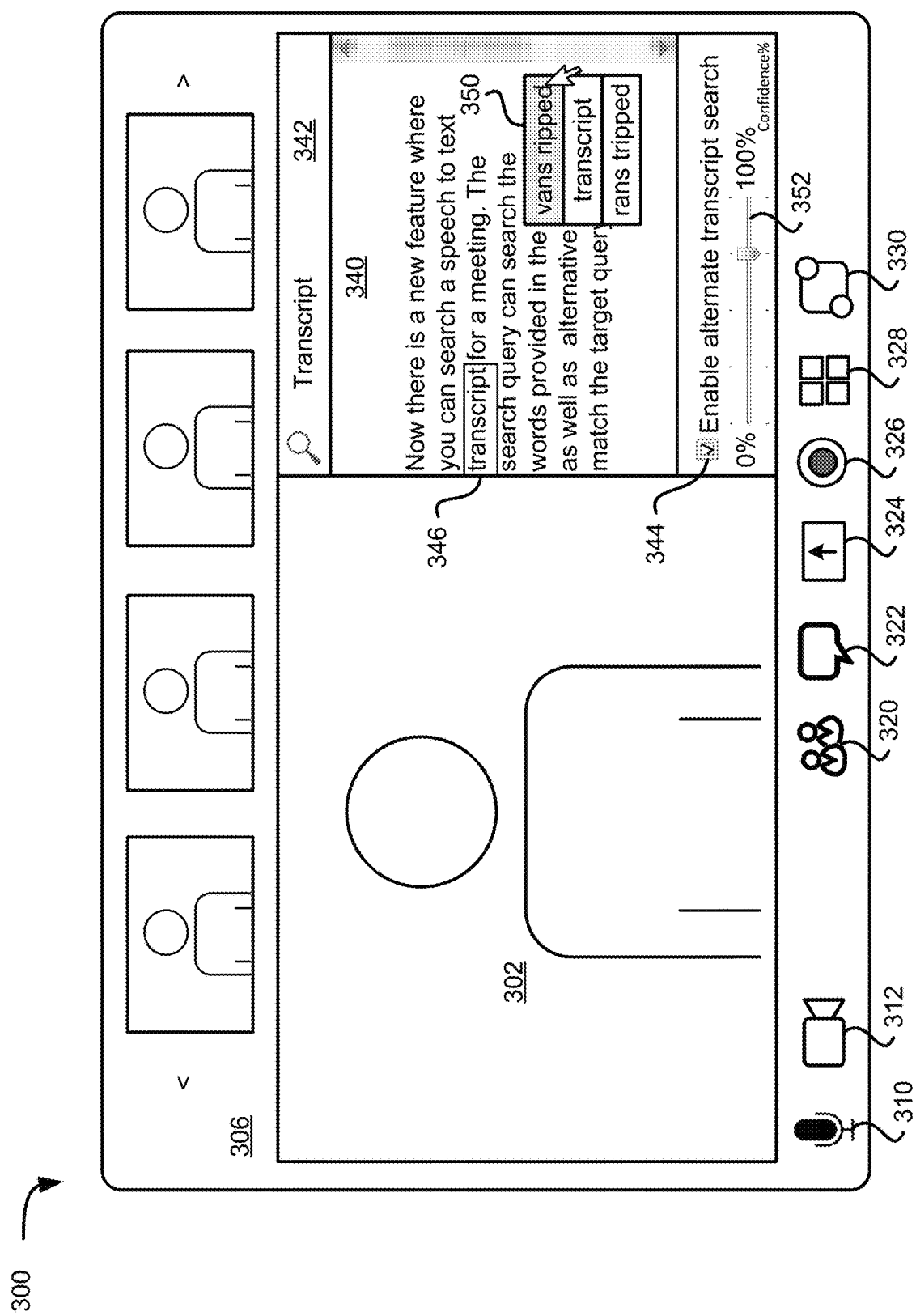
Figure 3D:
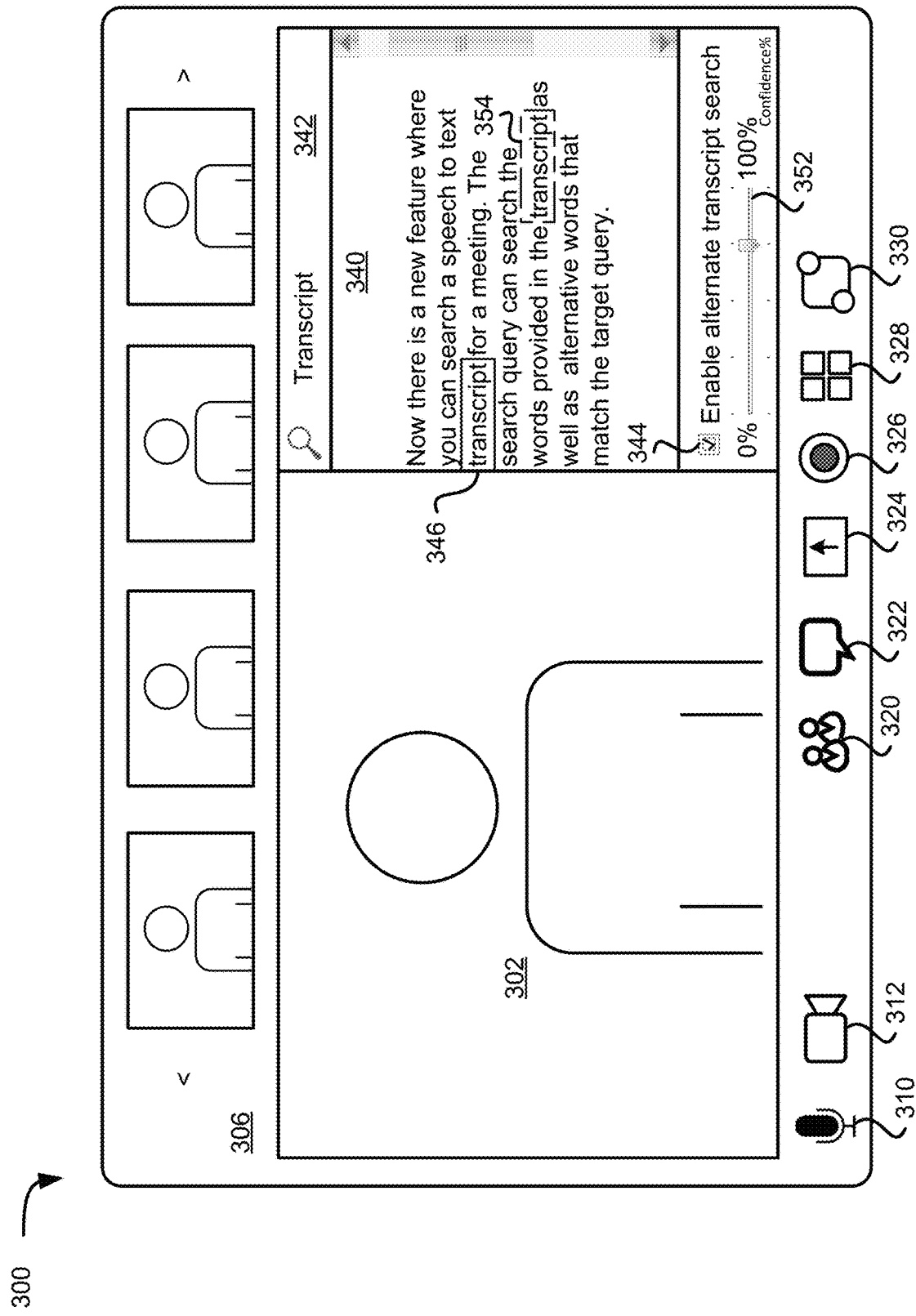

In some embodiments, the GUI 300 includes a control 344 that a user can enable or disable alternate transcription searching, including searching the transcription and the metadata, as discussed in greater detail herein. The control 344 can include any combination of control or menu items. For example, the control 344 can be a checkbox as depicted in FIG. 3A. As a checkbox, when unchecked, the control 344 can enable a normal transcription search, as shown in FIG. 3A. In contrast, the control 344 checkbox can enable the alternate transcription searching when checked, as shown in FIGS. 3B-3D. Continuing the example in FIG. 3A, when the search bar 342 receives a string input of "Transcript", then the transcription in audio transcription window 340 is searched for a matching string 346. As shown in FIG. 3A, a matching string 346 is found as "transcript". The search is limited to the single "transcript" search result because the alternate transcription searching is disabled (e.g., control 344 checkbox is not selected). However, in addition to the located matching string 346 for "transcript" within the audio transcription window 340, there may have been mis-recognized or mis-predicted word(s) 348 (word or phrase). For example, the speech of transcript may have been mis-recognized by the speech to text model as "vans ripped", which should have been transcribed as "transcript", based on the original audio speech. These words may have been returned as part of the search if the control 344 was enabled (e.g., checked), for example, based on a search of the metadata associated with the term "vans ripped". However, because the control 344 was not checked, the phrase "vans ripped" 348 is not identified as a potential matching term or phrase. In some embodiments, the GUI 300 includes a control 352 that a user can adjust the number of results, from metadata, for the alternate transcription. The control 352 can include any combination of control or menu items. For example, the control 352 can be a slider with percentages from 0% to 100% as depicted in FIGS. 3A-3D. As a slider, when control 344 is unchecked, the control 352 is default to 0%.

Referring to FIG. 3B, FIG. 3B shows an example of the GUI 300 if the control 344 was enabled prior to executing the text search of "Transcript". With the control 344 enabled, the string of "transcript" would be searched not just against the transcription in audio transcription window 340, as shown in FIG. 3A, but would also be searched against the metadata associated with that transcription. The metadata can include a word(s) associated with any combination of the words within the transcription and can include any number of alternative recognized or predicted words for each of the words provided within the transcription. For example, for the words "vans ripped", within the transcription, the metadata can include two alternative recognized or predicted words of "transcript" and "rans tripped" that were not selected as the recognized word for the transcript. The selection of "vans ripped" over "transcript" and "rans tripped" could be based on any number of factors, such as calculated confidence values based on the speech to text model 270. For example, "vans ripped" could have a confidence value of 76%, "transcript" a confidence value of 74%, and "rans tripped" a confidence value of 18%, such that the model predicted that "vans ripped" was the correct words to be used.

The example in FIG. 3B shows GUI 300 in which search results are provided for search matches within the transcription itself as well as matches within the metadata associated with that transcription. In the example shown in FIG. 3B, the search for the term "Transcript" returned results for a matching string 346 of "transcript" as well as the mis-recognized or mis-predicted word(s) 348 of "vans ripped". Each of the matching string 346 and the mis-recognized or mis-predicted word(s) 348 can be identified to the user as search results. The identified search results can be highlighted or emphasized using any combination of methods, for example, highlighting the search results in yellow. The search results can provide the same form of highlighting or emphasis or different depending on the type of results. For example, matching string 346 terms within the transcription can be highlighted in yellow, whereas mis-recognized or mis-predicted word(s) 348 within the transcription, but matched within the metadata, can be highlighted in red to draw attention to the user. In some embodiments, the recognized or mis-predicted word(s) 348 can be selectable to provide a user with options for correcting the transcription.

Referring to FIG. 3C, FIG. 3C shows an example of the GUI 300 after a user has selected a mis-recognized or mis-predicted word(s) 348. In response to selecting a mis-recognized or mis-predicted word(s) 348, a list of alternative terms 350 can be provided to the user for review. Continuing the example, in response to a user selecting the mis-recognized or mis-predicted word(s) 348 of "vans ripped", a list including alternative terms 350 of "transcript" and another alternative of "rans tripped" are presented within the GUI

300. The alternate terms of "transcript" and "rans tripped" can be metadata associated with the selected "vans ripped". In some embodiments, the GUI 300 includes a control 352 that allows a user to adjust the number of results shown, from metadata, for the alternate transcription. The control 352 can include any combination of control or menu items. For example, the control 352 can be a slider with percentages from 0% to 100% as depicted in FIGS. 3A-3D. As a slider, when control 344 is checked, the control 352 can allow a user to select how many alternatives they would like to see. The percentages on the slider can correspond to different values. For example, the percentages of the slider can correspond to confidence values or percentage of the total number of available terms within the list of alternative terms 350. Each of the provided alternative terms 350 can be selected by the user to replace the original mis-recognized or mis-predicted word(s) 348. searching.

Referring to FIG. 3D, FIG. 3D shows an example of the GUI 300 after a user has selected a replacement for the mis-recognized or mis-predicted word(s) 348. In response to selecting a replacement for mis-recognized or mis-predicted word(s) 348, from the list of alternative terms 350, an updated string 354 is inserted within the transcription. Thereafter, the transcription can be saved with the updated string 354 in place. Furthermore, feedback can be provided to the transcription engine indicating that this change was made (thereby helping the transcription engine to adjust future confidence levels for that specific usage).

Figure 4A:
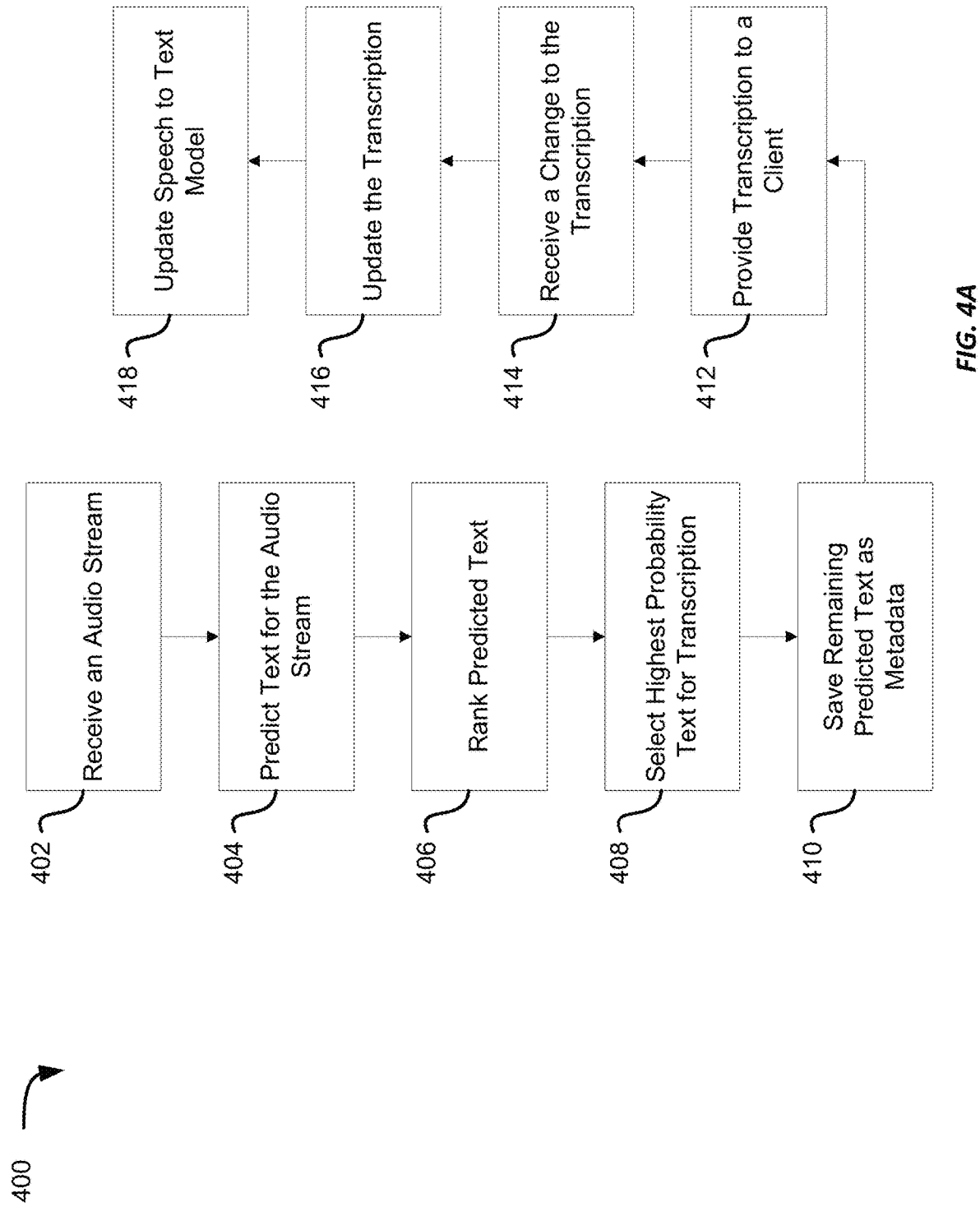
FIGS. 4A and 4B are flow charts depicting processes for identifying desired information within a transcription in accordance with various embodiments.
Figure 4B:
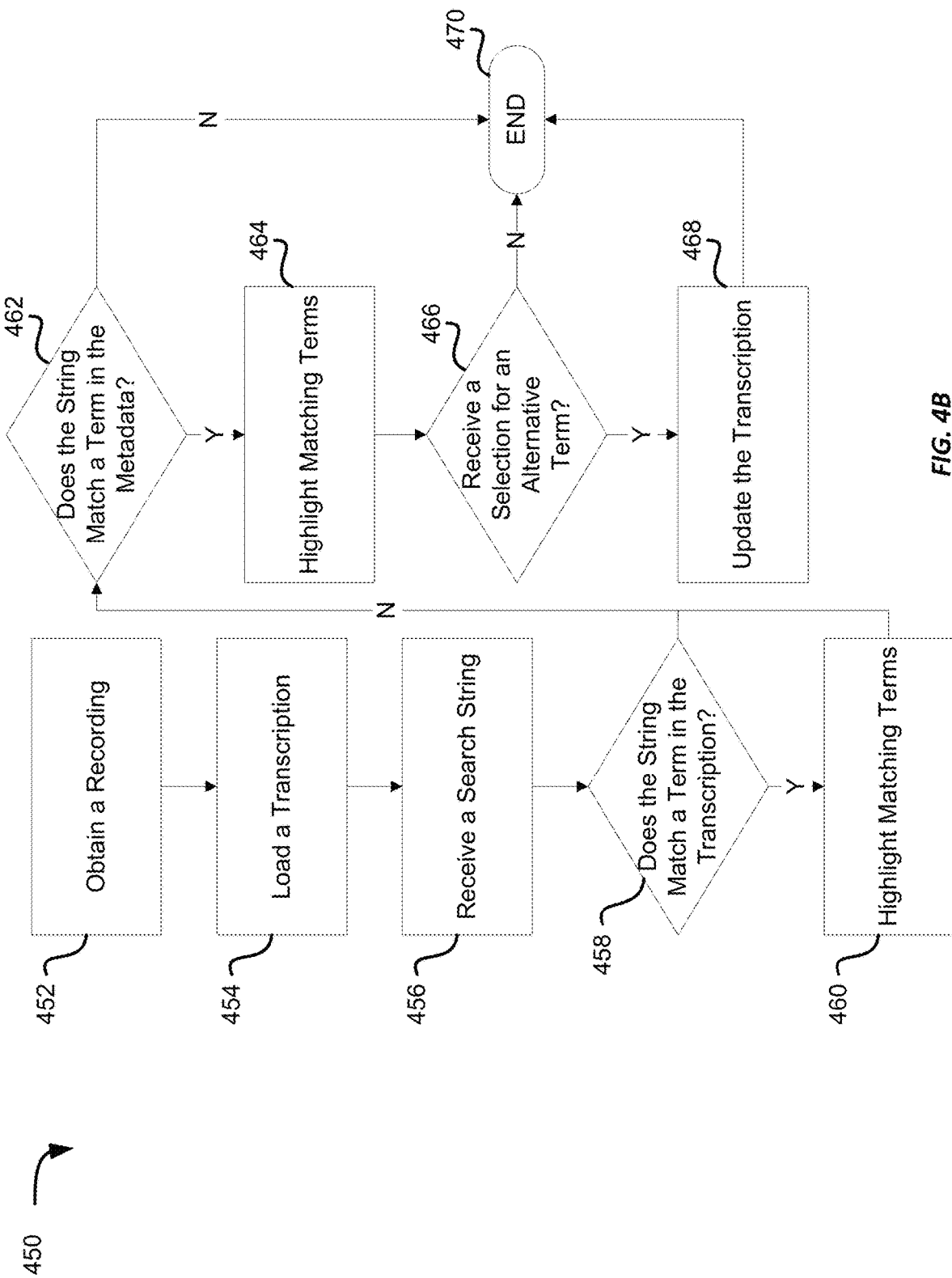

Referring now to FIGS. 4A and 4B, FIGS. 4A and 4B show example methods 400, 450 for using metadata to improve identifying desired information within a transcription. The methods 400, 450 of FIGS. 4A and 4B will be described with respect to the system 100, 200 and GUI 300 shown in FIGS. 1-3D; however, any suitable system according to this disclosure may be employed.

Referring to FIG. 4A, FIG. 4A shows an example method 400 for creating a speech to text transcription with searchable metadata associated therewith. At block 402, audio data is received. The audio transcription can be performed automatically using the audio of a virtual meeting or webinar that a user has recorded, locally or to the cloud. Once transcribed, the transcription text can be provided within the video itself and a user can enable or disable whether to display the transcription, similar to a closed caption display.

At block 402, audio data is received, such as from a participant's client device. The received audio data can include multimedia data including audio and video data or just an audio data, for example, a multimedia video of a virtual meeting with audio. The audio data can be provided locally or remotely for processing. For example, the audio data can be provided to a cloud computing environment for speech to text processing. Similarly, the audio data can be any combination of audio data, whether a stream, a clip, a file, a collection of files, etc.

At block 404, the text for the audio data is predicted. The text for the audio data can be predicted using any combination of speech to text systems and methods. For example, a speech to text model 270 can be used to parse, format, analyze the speech to make text predictions. In some embodiments, initially, the audio data can be separated into one or more segments and the predictions can be performed to predict or recognize terms within each of the one or more segments. The audio data can be separated into terms including syllables, words, phrases, etc. or a combination thereof, such that each term or collection or terms is transcribed into text for a syllable, word, phrase, etc., or a combination thereof. In some embodiments, the predictions can include assigning a confidence value or prediction score to each of the potential terms that may textually represent the speech in the audio data. For example, the word "asymmetric" could be transcribed with confidence values of: "a sim Eric"—22%, "a symmetric"—80%, "ace metric"—62%, "asymmetric"—48%. Although one instance of audio data for the speech of "asymmetric" provides these results, in another portion of the audio data, the speech of "asymmetric" could provide different results, for example, confidence values of: "a sim Eric"—12%, "a symmetric"—60%, "ace metric"—42%, "asymmetric"—88%. This would result in "asymmetric" being correctly transcribed.

In some embodiments, the confidence value or prediction score may include the confidence levels of the non-selected words, the confidence level of the selected word, linked phrases where the confidence level was adjusted for a single word to accommodate fitting in with a phrase (oftentimes the confidence level of a single word selected is not the highest if the tool can obtain a higher confidence level for an entire phrase with one of the words having a lower confidence level). For example, if a user says, "I guess we'll see", the confidence levels for each word may be "I"—93% "aye"—87% "eye"—65% "gust"—72% "guess"—52% "gets"—36% "wheel"v 95% "will"—82% "wilt"—65%, etc. whereas the highest confidence value for the entire phrase for "I guess we'll see" may be the highest of all possibilities (e.g., in contrast to a low score for "I gust wheel see.").

At block 406, the predicted text is ranked. The predictions can include identifying one or more terms that most likely represent the speech within the audio and identifying one or more terms that are less likely to represent the speech within the audio. In some embodiments, the most likely and less likely terms to represent the speech within the audio data can be determined based on the assigned confidence values or prediction scores from the speech to text processing. The assigned confidence values or prediction scores can then be ranked highest to lowest. Ranking the above example, from alphabetical order to confidence value order, would be "a symmetric"—80%, "ace metric"—62%, "asymmetric"—48%, "a sim Eric"—22%.

At block 408, the highest probability text is included in the transcription. For example, "a symmetric" at 80% would be the highest confidence value for the audio data for the spoken word "asymmetric", such that "a symmetric" would be provided as the text for the received speech for "asymmetric" (at least in one portion of the audio data). This would result in "asymmetric" being incorrectly transcribed.

At block 410, the remaining predicted text is saved as metadata. For example, the terms "ace metric" at 62%, "asymmetric" at 48%, and "a sim Eric" at 22% would not be the highest confidence value for the audio data for the spoken word "asymmetric", such that the terms "ace metric", "asymmetric", and "a sim Eric" would be saved as metadata. The terms "ace metric", "asymmetric", and "a sim Eric" would be considered alternative potentially correct terms for the portion of the transcription in which "a symmetric" was used. In some embodiments, to save space and processing efficiency, only a subset of the alternative terms can be saved as metadata. The subset can include all of the alternative terms with a confidence value above a predetermined threshold (or adjustable threshold). For example, if a threshold value of 45% is set, then the terms "ace metric" at 62% and "asymmetric" at 48% could be saved as metadata while the term "a sim Eric" at 22% is discarded.

These alternative potentially correct terms can be saved in a manner which links them to the spoken word "asymmetric" and to the transcribed phrase "a symmetric", at least in one portion of the transcription. For example, each of the predicted or recognized terms within the transcription can be associated with a unique identifier or other link to the respective alternative terms for that predicted or recognized term. The transcription can be generated and stored in any manner in which the words within the transcription can be searched as well as the metadata associated with at least some of the words within the transcription. After a transcription is processed, the transcription and the metadata can be saved as a single file or separate files associated with the recorded virtual meeting. By saving and not discarding the alternatives as metadata this enables a manner in which a search of a speech to text transcription can be improved, particularly when incorrect transcriptions have occurred.

At block 412, the transcription can be provided to a user for viewing and/or editing. The transcription can be provided through any combination of methods, such as for example, transmitting the transcription to a client device, providing the transcription via the cloud, providing access to the transcription to a client device over the Internet, etc. Providing a user access to the transcription can enable a user to view, search, edit, etc. the transcription, for example, as discussed with respect to method 450 discussed below.

At block 414, one or more revisions to the transcription is received. The revisions can include any combination of changes to the transcription, such as for example, adding one or more terms, deleting one or more terms or editing one or more terms. In some embodiments, the changes can include replacing a previously mis-recognized or mis-predicted word(s) within the transcription with a term from metadata associated with the predicted term, as discussed with respect to method 450.

At block 416, the transcription is updated. The transcription are updated using the one or more revisions received at block 414. In some embodiments, the update can be provided to replace the mis-recognized or mis-predicted word(s) with the selected word(s), as discussed with respect to method 450. The update can be made within that single instance within the transcription or it can be applied throughout the transcription, where appropriate. The transcription can be saved with the updated changes in place such that future access by users will be accessing the updated version of the transcription. The mis-recognized or mis-predicted word(s) may be added to the metadata (with their respective confidence levels) or they may be removed entirely from the transcription.

At block 418, the user input is used to improve the transcription process for future transcription. For example, the one or more revisions to the transcription are used to update and/or re-train the speech to text model 270.

Referring to FIG. 4B, FIG. 4B shows an example method 450 for performing a search for text within a transcription, including searchable metadata associated therewith. At block 452, a recording is obtained. The recording can include audio data, for example, the audio data from block 402. The recording can be provided locally or remotely for processing. For example, the audio data can be provided to a cloud computing environment for speech to text processing. Similarly, the recording can be any combination of audio data, whether a stream, a clip, a file, a collection of files, etc.

At block 454, a transcription for the recording is loaded. The transcription for the recording can be loaded automatically based on accessing the recording or the transcription can be provided as an optional setting within the application accessing the recording. For example, virtual meeting settings can include a setting to receive a transcription for the recording, which can be loaded and displayed within an audio transcription window 340 of a GUI 300.

At block 456, a search string is received. The search string can be received through any combination of input devices, such as text input, audio input, etc. For example, a text string of "Transcript" can be received as an input into a search bar 342 of the GUI or a user could type the text string into the search bar 342.

At block 458, a determination whether the string matches a term in the transcription is made. If there is a string match, then the method 450 advances to block 460, otherwise the method advances to block 462. The search can be performed using any combination of search techniques. For example, the text string in the search bar 342 can be compared against all the text within the transcription provided in audio transcription window 340 to determine if one or more matches exist. At block 460, matching terms within the transcription are highlighted or otherwise emphasized.

At block 462, a determination whether the string matches a term in the metadata is made. If there is a string match, then the method 450 advances to block 464, otherwise the method advances to block 470. The search can be performed using any combination of search techniques. For example, the text string in the search bar 342 can be compared against all the text within the transcription provided in audio transcription window 340 to determine if one or more matches exist. In some embodiments, the searches at block 458 and 462 can be part of the same search or can be separate searches operating substantially parallel to one another. In some embodiments, searching within the metadata can be enabled or disabled based on a setting within the virtual meeting. For example, the control 344 can be used to enable or disable metadata searching. If this setting is not enabled, then the metadata would not be searched (e.g., as shown in FIG. 3A).

At block 464, terms within the transcription that are associated with the matching terms within the metadata are highlighted or otherwise emphasized. For example, if the term "transcript" was identified in the metadata and was associated or linked to the term "vans ripped" within the audio transcription window 340, then the term "vans ripped" would be highlighted or otherwise emphasized. In some embodiments, search results, within the transcription, corresponding to matches within metadata can include providing an option to the user to select one or more of alternative terms, including the term that was returned in the search. For example, in response to receiving an indication that a user hovers a mouse over the highlighted word "vans ripped", a list of alternative terms 350 can be displayed, as shown in FIG. 3C. The list of terms 350 can include the terms themselves and may also include the confidence values that were assigned to those terms. In some embodiments, the accuracy or number of terms provided in the list of alternative terms 350 can be controlled by a user. For example, the control 352 can be used to limit the number of terms to those which meet a specified threshold value (e.g., confidence value) or it can be limited to a number of terms (e.g., top three alternatives).

At block 466, a determination whether a selection of an alternative term is received is made. If a selection is received, then the method 450 advances to block 468, otherwise the method advances to block 470. For example, as shown in FIG. 3D, a selection of the correct word from the list of alternative terms 350 can be received. This selection can be used to update the transcription and update training data.

At block 468, the transcription is updated. The update can be provided to replace the mis-recognized or mis-predicted word(s) with the selected word(s). For example, the mis-recognized or mis-predicted word(s) 348 of "vans ripped" can be replaced with the correct word of "transcript" as shown in FIG. 3D. The update can be made within that single instance within the transcription or it can be applied throughout the transcription, where appropriate. In some embodiments, in addition to updating the transcription, the user input can also be used to improve the transcription process for future transcription. For example, the transcription engine can use the transcription correction to update and/or train the speech to text model 270.

At block 470, the process ends.

While the operations of processes 400 and 450 are described as being performed by the systems 100, 200, it should be understood that any suitable device may be used to perform one or more operations of this process. Processes 400 and 450 described above) are illustrated as logical flow diagrams, each operation of which represents a sequence of operations that can be implemented in hardware, computer instructions, or a combination thereof. Additionally, any of the blocks can be performed by the various components of the system 100, 200. For example, the blocks can be performed on a server or cloud, on a client computing device, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes 400 and 450.

Figure 5:
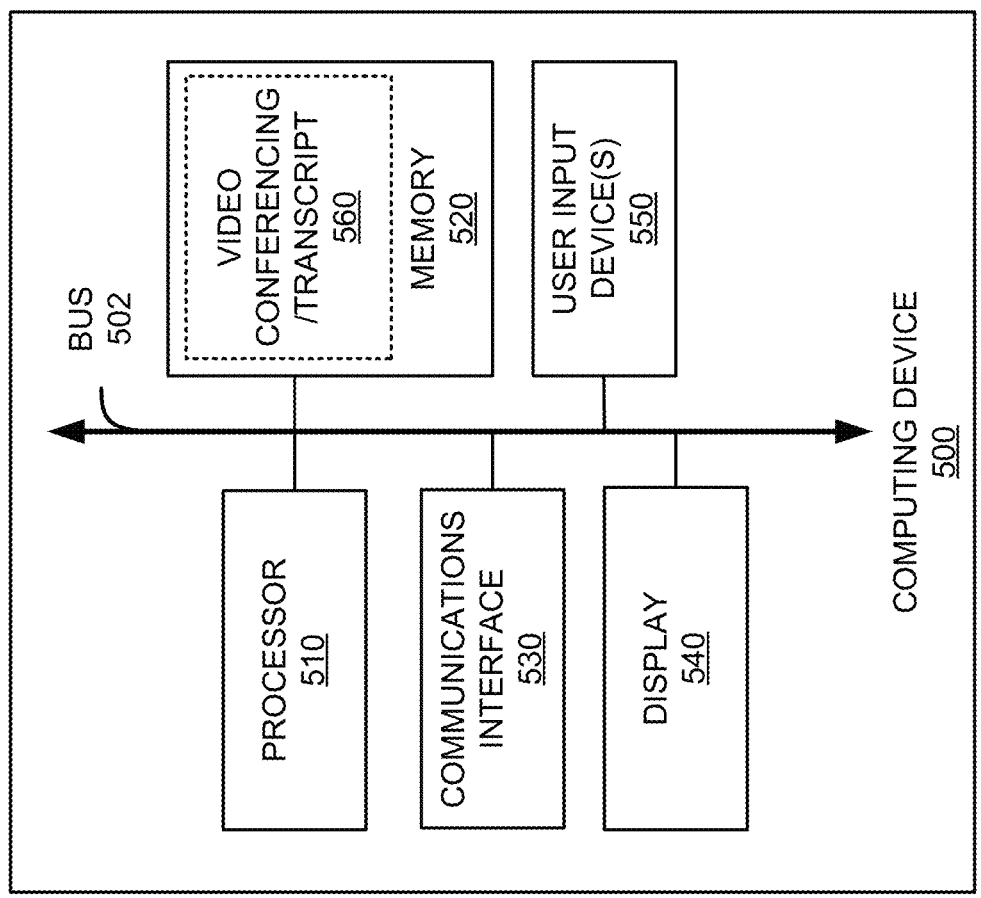
FIG. 5 shows an example computing device suitable for use with systems and methods in accordance with various embodiments.

Referring now to FIG. 5, FIG. 5 shows an example computing device 500 suitable for use according to this disclosure. The example computing device 500 includes a processor 510 which is in communication with the memory 520 and other components of the computing device 500 using one or more communications buses 502. The processor 510 is configured to execute processor-executable instructions stored in the memory 520 to perform one or more methods according to different examples, such as part or all of the example methods 400, 450 described above with respect to FIGS. 4A and 4B. The computing device 500, in this example, also includes one or more user input devices 550, such as a keyboard, mouse, touchscreen, microphone, etc., to accept user input. The computing device 500 also includes a display 540 to provide visual output to a user.

In addition, the computing device 500 includes a video conferencing application 560 to enable a user to join and participate in a video conference, such as a conventional meeting or webinar, by receiving multimedia streams from a video conference provider, sending multimedia streams to the video conference provider, joining and leaving breakout rooms, engaging in participant interactions during a virtual meeting, etc. such as described throughout this disclosure, etc.

The computing device 500 also includes a communications interface 540. In some examples, the communications interface 530 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
receiving audio data;
recognizing terms within the audio data, wherein each recognized term is a candidate recognized term;
identifying alternate recognized terms within the audio data, the alternate recognized terms corresponding to the recognized terms within the audio data;
computing, for each of the recognized terms and the alternate recognized terms, an associated probability that the term corresponds to a spoken term within the audio data;
generating a transcription based on the recognized terms and the associated probabilities;
generating metadata associated with the transcription, the metadata comprising the alternate recognized terms and the associated probabilities and a link between each recognized term and the corresponding alternate recognized terms, comprising, for each candidate recognized term:
generating a plurality of terms including the candidate recognized term and the respective alternate recognized terms;
designating a term with the highest associated probability as the recognized term; and
ordering the metadata according to an order of the associated probabilities of remaining terms;
updating the transcription to include the metadata; and
providing the transcription and the metadata to a client device to cause the client device to display a graphical user interface ("GUI") for viewing the transcription, wherein the GUI is configured to display, in response to a search query, a recognized term based on the search query and a GUI control for selecting an alternate recognized term of the alternate recognized terms corresponding to the recognized term having an associated probability greater than a configurable threshold probability.

2. The method of claim 1, further comprising:
separating the audio data into one or more segments; and
predicting the recognized terms and the alternate recognized terms for each of the one or more segments.

3. The method of claim 1, further comprising:
receiving, from the client device, a selection of one of the of alternate recognized terms corresponding to the recognized term; and
updating the transcription to include the selection in place of the recognized term.

4. The method of claim 3, further comprising:
translating the transcription from a first language to a second language;
identifying alternate translated terms within the translated transcription, the alternate translated terms corresponding to translated terms in the translated transcription; and
generating translated metadata associated with the translated transcription, the translated metadata comprising the alternate translated terms with links between the translated terms and the alternate translated terms.

5. The method of claim 3, further comprising:
updating a training model based on the selection.

6. The method of claim 3, further comprising:
receiving, from the client device, an indication of the selection; and
reconfiguring an associated probability computation based on the selection.

7. The method of claim 1, wherein the audio data is based on an audio stream received from the client device, the client device being a participant of a plurality of participants in a video conference hosted by a video conference provider.

8. A system comprising:
one or more processors; and
a memory coupled to the one or more processors, the memory storing a plurality of instructions executable by the one or more processors, the plurality of instructions comprising instructions that when executed by the one or more processors cause the one or more processors to:
receive audio data;
recognize terms within the audio data, wherein each recognized term is a candidate recognized term;
identify alternate recognized terms within the audio data, the alternate recognized terms corresponding to the recognized terms within the audio data;
compute, for each of the recognized terms and the alternate recognized terms, an associated probability that the term corresponds to a spoken term within the audio data;
generate a transcription based on the recognized terms and the associated probabilities; and
generate metadata associated with the transcription, the metadata comprising the alternate recognized terms and the associated probabilities and a link between each recognized term and the corresponding alternate recognized terms, comprising, for each candidate recognized term:
generating a plurality of terms including the candidate recognized term and the respective alternate recognized terms;
designating a term with the highest associated probability as the recognized term; and
ordering the metadata according to an order of the associated probabilities of remaining terms;
update the transcription to include the metadata; and
provide the transcription and the metadata to a client device to cause the client device to display a GUI for viewing the transcription, wherein the GUI is configured to display, in response to a search query, a recognized term based on the search query and a GUI control for selecting an alternate recognized term of the alternate recognized terms corresponding to the recognized term having an associated probability greater than a configurable threshold probability.

9. The system of claim 8, further comprising additional instructions that when executed by the one or more processors cause the one or more processors to:
separate the audio data into one or more segments; and
predict the recognized terms and the alternate recognized terms for each of the one or more segments.

10. The system of claim 8, further comprising additional instructions that when executed by the one or more processors cause the one or more processors to:

receive, from the client device, a selection of one of the of alternate recognized terms corresponding to the recognized term; and update the transcription to include the selection in place of the recognized term.

11. The system of claim 10, further comprising additional instructions that when executed by the one or more processors cause the one or more processors to:

update a training model based on the selection.

12. The system of claim 10, wherein each recognized term is a candidate recognized term and further comprising additional instructions that when executed by the one or more processors cause the one or more processors to:

receive, from the client device, an indication of the selection; and reconfigure an associated probability computation based on the selection.

13. A non-transitory computer-readable memory storing a plurality of instructions executable by one or more processors, the plurality of instructions comprising instructions that when executed by the one or more processors cause the one or more processors to:

receive audio data;

recognize terms within the audio data, wherein each recognized term is a candidate recognized term;

identify alternate recognized terms within the audio data, the alternate recognized terms corresponding to the recognized terms within the audio data;

compute, for each of the recognized terms and the alternate recognized terms, an associated probability that the term corresponds to a spoken term within the audio data;

generate a transcription based on the recognized terms and the associated probabilities; and generate metadata associated with the transcription, the metadata comprising the alternate recognized terms and the associated probabilities and a link between each recognized term and the corresponding alternate recognized terms, comprising, for each candidate recognized term:

generating a plurality of terms including the candidate recognized term and the respective alternate recognized terms;

designating a term with the highest associated probability as the recognized term; and ordering the metadata according to an order of the associated probabilities of remaining terms;

update the transcription to include the metadata; and provide the transcription and the metadata to a client device to cause the client device to display a GUI for viewing the transcription, wherein the GUI is configured to display, in response to a search query, a recognized term based on the search query and a GUI control for selecting an alternate recognized term of the alternate recognized terms corresponding to the recognized term having an associated probability greater than a configurable threshold probability.

14. The non-transitory computer-readable memory of claim 13, further comprising additional instructions that when executed by the one or more processors cause the one or more processors to:

separate the audio data into one or more segments; and predict the recognized terms and the alternate recognized terms for each of the one or more segments.

15. The non-transitory computer-readable memory of claim 13, further comprising additional instructions that when executed by the one or more processors cause the one or more processors to:

receive, from the client device, a selection of one of the of alternate recognized terms corresponding to the recognized term; and update the transcription to include the selection in place of the recognized term.

16. The non-transitory computer-readable memory of claim 15, further comprising additional instructions that when executed by the one or more processors cause the one or more processors to:

update a training model based on the selection.

17. The non-transitory computer-readable memory of claim 15, wherein each recognized term is a candidate recognized term and further comprising additional instructions that when executed by the one or more processors cause the one or more processors to:

receive, from the client device, an indication of the selection; and reconfigure an associated probability computation based on the selection.

* * * * *